US010523465B2

(12) United States Patent
Mazarick (10) Patent No.: US 10,523,465 B2
(45) Date of Patent: *Dec. 31, 2019

(54) SYSTEM AND METHOD FOR PROVIDING PRIVATE INSTANCES OF SHARED RESOURCES USING VXLAN (71) Applicant: Michael Emory Mazarick, Raleigh, NC (US)

(72) Inventor: Michael Emory Mazarick, Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/286,448

(22) Filed: Feb. 26, 2019

(65) Prior Publication Data
US 2019/0199551 A1 Jun. 27, 2019

Related U.S. Application Data (63) Continuation of application No. 15/688,836, filed on Aug. 28, 2017, now Pat. No. 10,277,420.

(51) Int. Cl.
G06F 9/00 (2006.01)
H04L 12/46 (2006.01)
G06F 9/50 (2006.01)
H04L 29/06 (2006.01)
G06F 15/16 (2006.01)

(52) U.S. Cl.
CPC .......... *H04L 12/467* (2013.01); *G06F 9/5038* (2013.01); *H04L 12/4633* (2013.01); *H04L 12/4641* (2013.01); *H04L 63/02* (2013.01); *H04L 63/0272* (2013.01)

(58) Field of Classification Search
None
See application file for complete search history.

(56) References Cited

U.S. PATENT DOCUMENTS

| 9,628,379 | B2 | 4/2017 | Nedeltchev | |
|---|---|---|---|---|
| 9,749,149 | B2 | 8/2017 | Mazarick | |
| 9,785,457 | B2* | 10/2017 | Nakagawa | G06F 9/45533 |
| 10,164,866 | B2* | 12/2018 | Du | H04L 12/4641 |
| 2009/0106405 | A1 | 4/2009 | Mazarick | |
| 2012/0304274 | A1* | 11/2012 | Mazarick | H04L 12/4641 726/11 |
| 2013/0322453 | A1* | 12/2013 | Allan | H04L 12/4662 370/395.53 |
| 2014/0130046 | A1 | 5/2014 | Okuno et al. | |
| 2014/0208317 | A1 | 7/2014 | Nakagawa | |
| 2014/0351812 | A1* | 11/2014 | Imai | G06F 9/45533 718/1 |
| 2015/0195104 | A1 | 7/2015 | Okuno et al. | |
| 2016/0226967 | A1* | 8/2016 | Zhang | H04L 49/25 |
| 2016/0269232 | A1 | 9/2016 | Hitichi | |
| 2017/0099187 | A1 | 4/2017 | Dale et al. | |
| 2017/0142007 | A1 | 5/2017 | Nedeltchev et al. | |
| 2017/0170988 | A1* | 6/2017 | Mazarick | H04L 12/4641 |
| 2018/0027080 | A1* | 1/2018 | Yang | H04L 41/12 709/224 |

* cited by examiner

Primary Examiner — Kenny S Lin (57) ABSTRACT

A system and method for providing private instances of shared resources utilizing VxLAN technology is disclosed, the system consisting of a private management local area network (MLAN), a separate virtual local area network (VLAN) to place resources that are to be shared, and private instances (replicas) of the shared resources that are located on a client's private network.

20 Claims, 6 Drawing Sheets

SYSTEM AND METHOD FOR PROVIDING PRIVATE INSTANCES OF SHARED RESOURCES USING VXLAN

CROSS-REFERENCE TO RELATED APPLICATIONS

This application is based upon and claims the benefit of priority of the prior U.S. patent application Ser. No. 15/688,836 (now U.S. patent Ser. No. 10/277,420), filed on Aug. 28, 2017, the entire contents of which are incorporated by reference.

BACKGROUND OF THE INVENTION

The scale of Cloud services continues to expand. What was once "good enough" via Q-in-Q cloud deployments (up to 1,048,576 devices/networks) has been supplanted by VxLAN technology which has the capability of 16,777,216 networks*16,777,216 devices. It points the way for IPv6 deployment with expanded addressing capability and provides a way for the IoT to be deployed. There are three main advantages to VxLAN: a) increased addressing space and scalability because VxLAN has 24 bits vs. 12 with VLANs in the tag associated with VxLAN b) Layer 2 Virtual network is completely separate from Layer 2 physical network. This allows the Layer 2 network to be extended to a different location, c) isolation/security provided by having each Virtual Terminal Point along the way provide encryption of the tag at each point along the way while maintaining encryption of the Layer 2 "payload".

Although a lot has been disclosed about VxLAN, what has not been disclosed is how industrial grade cloud providers can provide private instances of shared resources. This is especially tricky because it is easy, trivial, and known by anyone skilled in the art is how to provide "human scale" private instances—use the hypervisor to provide private instances. Every major hypervisor has an ability to provide private instances on a virtual machine. What will be taught in this patent disclosure is how to do the same thing that a hypervisor does with virtual machines using a cluster of physical machines on a scale that matches VxLAN's enhanced addressing capabilities.

In the field of VxLAN networks (VxLAN), a system is used to isolate clients into individual private networks, as long as they possess conforming equipment (virtual or physical) to meet the specifications, which are governed by IETF standards. The key component is a VTEP (Virtual Transmission End Point) for providing a new encryption when it leaves the network, a firewall which prevents unauthorized packets from entering the network, and a router to provide a route to another network controlled by the client with a VTEP.

What is described herein is using the concepts of networks and virtualization on a large pooled system to be able to dynamically allocate private instances of shared resources to users.

Herein, the term "computing device" refers to any electronic device with a processor and means for data storage. Used herein, the term "network connection" refers to any means to allow a plurality of computing devices to communicate. Further, the term "trunked" used herein refers to programmatically relating multiple network connections to each other to create redundancy and greater bandwidth in a single logical connection. The term "network packets" refers to a formatted message in the form of packets transmitted over a network. The term "hardware resource" refers to a networkable computing device. The term "virtual resource" refers to an allocation on a networkable computing device which refers to a virtual representation of a computing device or a software application, such as a database. Used herein, the term "management local area network", sometimes referred to as a "MLAN", refers to a LAN containing hardware or virtual resources used exclusively for the initialization, configuration, and maintenance of other LANs. Used herein, the term "data center" refers to a central storage complex containing a multitude of servers and network routing hardware. A "traditional data center" is a data center absent of virtualization. The term "virtual firewall/vtep/router" refers to a virtual implementation of a firewall/vtep/router with a virtual Ethernet port. Used herein, the term, "maintaining" refers to keeping a network resource functioning.

SUMMARY OF INVENTION

Disclosed herein is a system, method and computer program product for initializing and maintaining private instances of shared resources utilizing VxLAN standards. A virtual and/or a physical network contains a management local area network (MLAN) and numerous client networks nested within a top-level network. The MLAN contains at least a physical or virtual firewall/vtep/router combination. Each client network contains a firewall/vtep/router combination as well as a number of physical hardware machines and virtual machines maintained by the management system. The client network appears as a normal separate network to the client.

The system itself connects a plurality of computer systems as a clustered system through a switched fabric communications link. All storage devices in the system may be clustered to create a distributed file system, which makes the drives appear to be a giant pool of space in which any particular virtual machine may be contained anywhere within.

Described herein is a method for sharing a network resource, physical or virtual, between a plurality of client networks. The private instances of shared resource may be contained in one or many of the client networks.

In the preferred embodiment, a system for organizing and managing private instances of shared resources is disclosed. The system comprises at least one network switch, and at least one computing device. The computing device includes at least one management console to interface with at least one client, at least one network connection, and at least one storage device. The storage device contains software capable of initializing and maintaining a management local area network (MLAN) comprising a firewall, and a plurality of client virtual local area networks (VLANs), wherein each client network comprises a virtual firewall and a plurality of network resources. The plurality of network resources are virtual resources determined, and allocated via a selection mechanism using at least a resource factor, on at least one networkable computing device. A private network to the management system shared resources network is provided and replicas of virtual machine are provided on the client's network via a virtual wire that the client can't network through. It is like a "one way mirror", because it is completely visible to the management system and completely invisible and not able to be networked through from a client perspective. It is used to keep clients separate.

In the preferred embodiment, a method for organizing and managing private instances of shared resources is disclosed. The method comprises initializing a management local area network (MLAN) comprising a firewall/VTEP/router combination, adding a plurality of client virtual local area networks (VLANs), wherein each client network comprises a virtual firewall/VTEP/router combination and a plurality of network resources; maintaining MLAN and clients networks. A private network to the management system shared resources network is provided and replicas of virtual machine are provided on the client's network via a virtual wire that the client can't network through. It is like a "one way mirror", because it is completely visible to the management system and completely invisible and not able to be networked through from a client perspective. It is used to keep clients separate.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
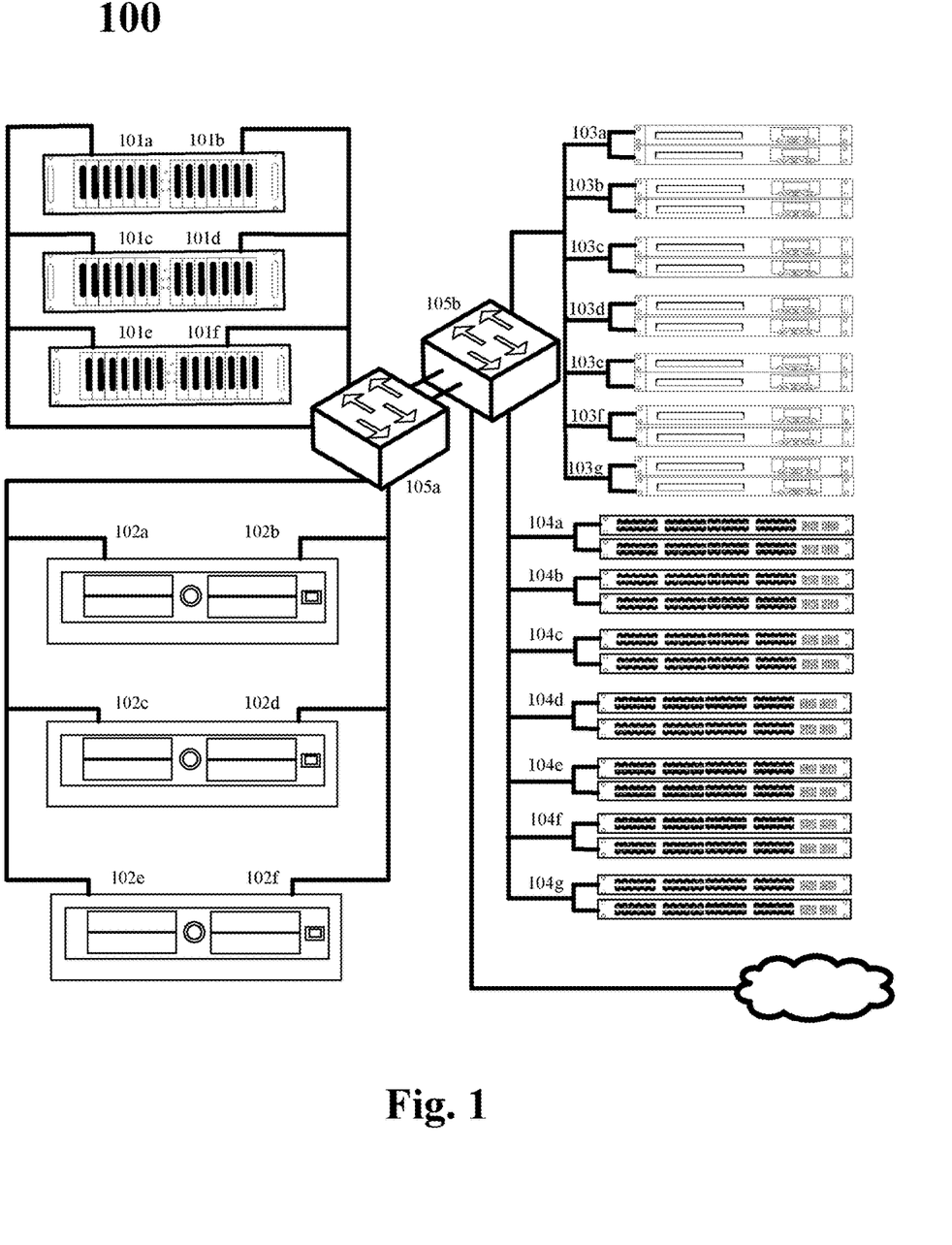
FIG. 1 is a block diagram of the hardware used in the system.

Referring to FIG. 1, system 100 comprises a plurality of redundant array of inexpensive storage nodes (RAIDS) 101a-101f, a plurality of non-redundant storage nodes 102a-102c, a plurality of processing nodes 103a-103g, a plurality of network connections 104a-104g, and a plurality of network switches 105a-105b. Storage nodes 101a-101f are redundant high level storage. Storage nodes 101a and 101b make a pair, 101c and 101d make a pair, and 101e and 101f make a pair. Solid State Disks (SSDs) are utilized for databases and high throughput disk operations in nodes 102a-102f. SSDs 102a and 102b make a pair, 102c and 102d make a pair, and 102e and 102f make a pair. Each processing node 103a through 103g contains 2 or more multi-core processors. In this embodiment, network connections 104a through 104g are shown as an ethernet switch, but any embodiment can have any transport mechanism.

In additional embodiments, network connections 104 may use more or less connections and use other protocols. Network switch 105a may be a switch such as an Ethernet switch depending on what protocol network connections 104 use, network switch 105b is may be a switch such as an Ethernet switch used to communicate outside the network. The switches are able to add networks on a granular level. The switches may natively support VLANs, which allow for VLANs out of the box. All client tags are handled by processing nodes 103. One of ordinary skill in the pertinent art will recognize that the number of components shown in FIG. 1 is simply for illustration and may be more or less in actual implementations.

Figure 2:
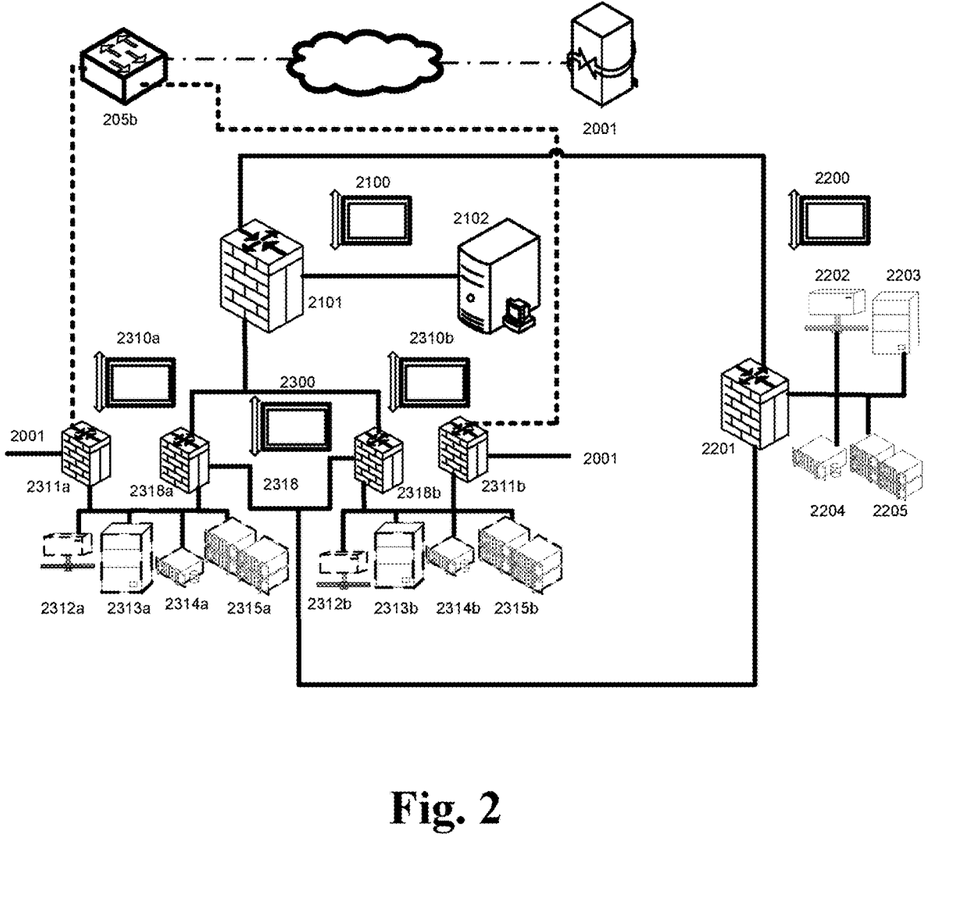
FIG. 2 demonstrates reaching shared resources through private, non-editable client firewall/vtep/routers.

Referring to FIG. 2, network 2100 is a top-level network used as a management LAN, or MLAN, containing the firewall/vtep/router 2101 initialized by the storage server. MLAN 2100 is responsible for the initialization, configuration, and maintenance of all client networks in system 100, as well as shared resource networks and physical networks on the system. Firewall/vtep/router 2101 has 3 ports, one connected to MLAN 2100, one connected to 10 Top-layer network 2300 ("VLAN 0"), and one connected to network 2200, the shared resources network. Top-layer network 2300 contains multiple client networks 2310, all with their own firewall/vtep/router, 2311.

One of ordinary skill in the pertinent art will recognize that the numbers of elements depicted in FIG. 2 are only exemplary. Each top-layer network may contain up to 255 or 4,095 client networks (depending on the vendor and price point chosen). There is also VxLAN equipment available that allows up to 16,777,216 different networks of 16,777,216 devices per network by having a special "tag". All tags are removed by the management system before it is placed in a client's Virtual Data Center. On boot up, each storage node 101 contacts each of the other storage nodes to discover whether or not any of them has started the boot process of creating a management firewall/vtep/router 2101, a boot server and a management console 2102. If none of the other nodes has started the process yet, the pinging node begins the process. Initially the management firewall/vtep/router 2101 or a management firewall/vtep/router cluster is started. If the MLAN 2100 is routed by a virtual firewall/vtep/router, the storage nodes 101 will need to initially run the process that starts the management firewall/vtep/router cluster. This does not preclude a hardware firewall/vtep/router for the MLAN 2100, but in this embodiment only servers and switches are needed and the same underlying structures that provide redundancy and availability to servers can give high availability to firewall/vtep/routers and routers in a virtual environment.

In the preferred embodiment, a group of storage servers can start redundant copies of the firewall/vtep/router/router 2101. Each instance of the firewall/vtep/router will have the same MAC address and network assignment for any attached Ethernet ports. Using normal routing schemes, this may cause a bank of switches to route packets to differing firewall/vtep/routers depending on the source of a connection, but this will have no ill effects if the network devices in question continue to have the same settings and routing information.

The private instances of shared resources undergo a normal startup process themselves. Once a command to start a private instance of shared resources is issued, (either by a system-wide startup, client start command or other system need) the management console 2102 takes the start request and queries the data source of available processing nodes. Once one is selected by the mechanism mentioned above; that private instance of shared resources creates an Ethernet device that is attached to either the top layer network or the nested network 2310 that the private instance of shared resources connects to. Unlike normal Ethernet devices, this network device is not given an IP address or any routing information. The physical server itself does not respond and actually does not see any packets it receives from this interface. The physical device is instead mapped directly to a virtual one, giving the virtual machine access to a completely separate network than the physical machine exists on. After the appropriate network devices are added to a processing node, the management console 2102 then queries its data source and connects to the client's hidden firewall/vtep/router.

On startup of the private instance of shared resources, a rule is added to provide the client with console access to a web interface to the management console 2102. This gives the clients the ability to access private instance of shared resources as if they were at the keyboard of a physical machine. From the client's secure management console web interface they are able to control the screen, keyboard and mouse inputs of their private instances of shared resources.

When a new client is added, they are given a number of external IPs and a unique subnet of their network. Every possible IP of the subnet is statically assigned to a MAC address that may or may not be used. A client network 2310 is created and the first address of the subnet is assigned to the client network's firewall/vtep/router 2311. The firewall/vtep/router contains a DHCP table that is created when the firewall/vtep/router is initialized to hold the mappings of the preregistered MAC addresses to IPs so that the IP is known as machines are added. The client is provided with a gateway 2001 configured to deliver the client's network packets directly to the virtual firewall/vtep/router 2311 through an IPSEC tunnel. In addition, network packets of all external traffic are routed directly to the client's virtual firewall/vtep/router 2311. Virtual firewall/vtep/router 2311 has one port connected to a virtual firewall/vtep/router 2318 which receives external traffic through network switch 205b, which is equivalent to network switch 105b. Traffic from the client through the IPSEC tunnel to the client's individual network 2310a is shown as a dotted line in FIG. 2. Virtual firewall/vtep/router 2311 further has one port connected to their individual client network 2318, and in some embodiments, an optional port for connecting to a replica of shared resources 2319, such as those contained in network 2200.

The last address of the subnet is assigned as the management console 2102. The management console 2102 is connected to main firewall/vtep/router 2101 in MLAN 2100 and, in some embodiments, is reached through the optional port of the client firewall/vtep/router. From there, the client may view network settings and add machines 2312-2315. The client is able to create and be charged for private instances of shared resources on their client network. The client is capable of adding replicas of private instances of shared resources because they are already on the network, but their MAC/IP is not assigned and they are not visible. The private instances of shared resources may be just about any kind of solution, such as a Windows or Linux web server, a voice-over-IP server, etc. After template is chosen, a MAC address is assigned from the client firewall/vtep/router 2311 and a template image corresponding to the shared resources from a storage node 101 is taken and initialized in storage. From there, the management console 2102 adds the share resource to the list of shared resources that need to be ran. The next processing node 103 that inquires on tasks that need to be run is assigned the machine. If it is the first machine run on that particular client network, it starts up a virtual listening port for that network. Once the virtual machine is connected to the network, the firewall/vtep/router looks at its MAC address and assigns it its preconfigured IP address from the DHCP table.

The client is able to use HTML5 or remote desktop to login to the newly created virtual machine and see the user API/GUI as if they were sitting in front of a physical machine with the same image. From there the user is allowed to do anything that can be normally done on a physical machine, completely abstracted from the virtualization of the machine or the fact that it is contained in a network ran on system 100 in a distant data center. To the user, virtual machine replicas 2312-2315 appear to be like any other physical machine contained on a traditional network subnet.

Clients are able to access private instances of share resources in a shared resources network such as resources 2202-2205 in network 2200. In some embodiments, clients are able to connect to these resources by setting up the optional port on their client firewall/vtep/router 2311 to connect to the IP of the selected shared resource. An empty network is created between the ports of both firewall/vtep/routers on both sides as a "virtual wire". It should be pointed out that the network is "empty" and can't be networked thru from the client perspective. When viewed from the management system (which the client can't access), everything is visible. It is similar to a one way mirror where all light is reflected back when you are on one side of the mirror (can't be networked thru) but is a transparent piece of glass on the other side (the MLAN side). Rules are set up on the firewall/vtep/routers on both ends to handle the new traffic. On the client network side, firewall/vtep/router 2311 dynamically adds a virtual port to itself and maps the port in a network address table within client's firewall/vtep/router 2311. If a client wishes to share resources from more than one location, multiple optional ports may be added. In this situation, the firewall/vtep/router must be temporarily shut down to make the additional connection.

Figure 3:
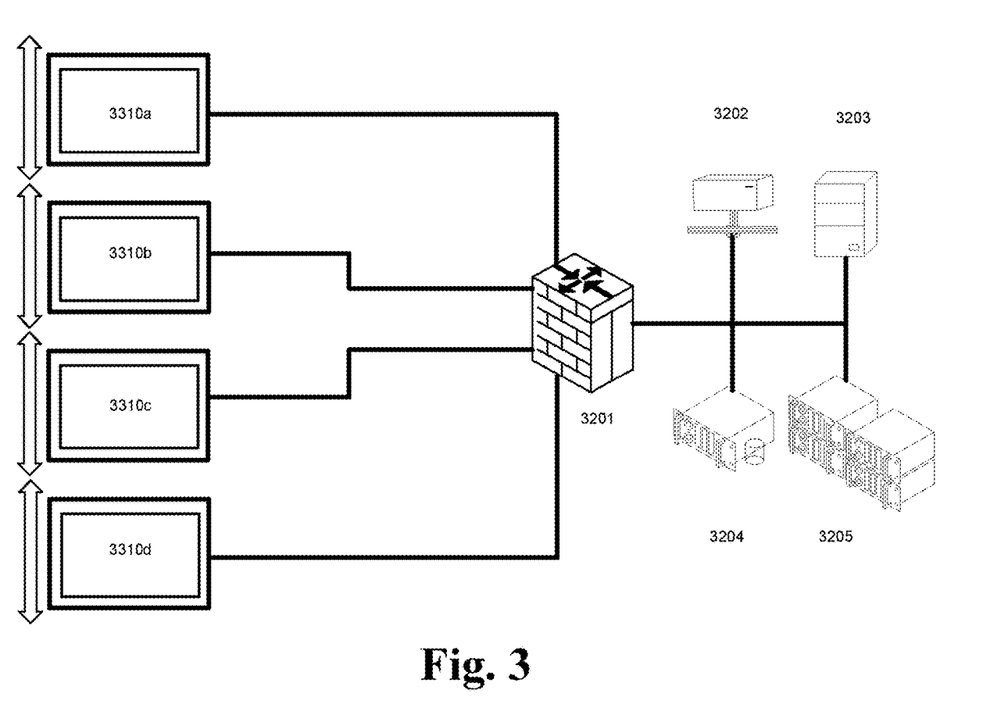
FIG. 3 demonstrates reaching shared resources through multiple ports of a shared resource firewall/vtep/router.

FIG. 3, shared resource network 3200 and client networks 3310 are identical to preferred embodiment that has a separate port on shared resource firewall/vtep/router 3201 and for each incoming connection from client networks 3310 attempting to use a shared resource 3202-3205. A firewall/vtep/router rule is designed for each individual port.

Figure 4:
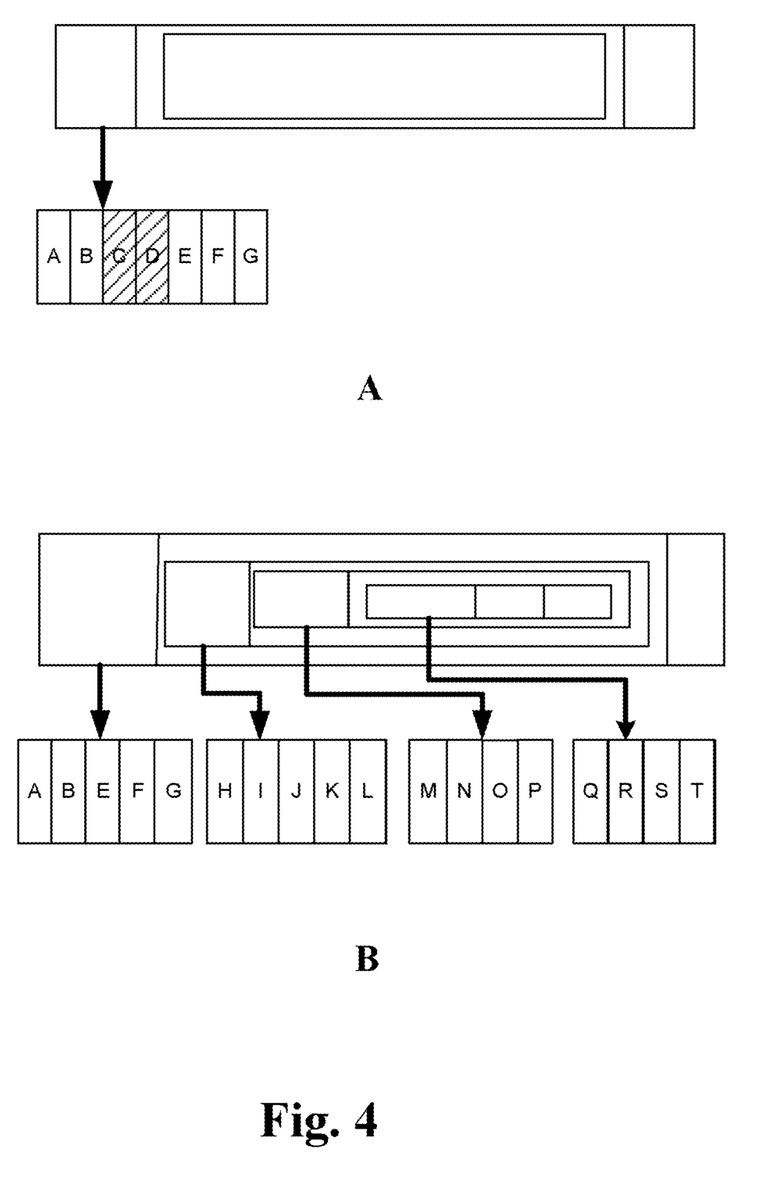
FIG. 4 illustrates the tag structure for both VxLAN and QinQ tags before they are removed by the management system and the resulting untagged information is placed in a client's virtual data center.

FIG. 4 Illustrates the structure of tags for both QinQ and VxLAN. A is a depiction of the QinQ header tag structure. Components A-G of A are individually explained. The header tag is 22 bytes long. Component A is 6 bytes long and contains the Destination Address. Component B is 6 bytes long and contains the Source Address. Component C is 2 bytes long and contains the VLAN Type 0x8a88. Component D is 2 bytes long and contains a second VLAN Tag. Component E is 2 bytes long and contains the VLAN Type 0x8100. Component F is 2 bytes long and contains the first VLAN tag. Component G is 2 bytes long and contains Ethernet Type 0x0800. B is a depiction of the VxLAN header tag structure. Since there are more components in the VxLAN structure, they are broken into groups. The first group of components called the Outer MAC Header, is Component A, B, C, D, and G. In total, they are 14 bytes long with 4 bytes being optional. This group is equivalent to the corresponding header tags in the QinQ header tag. Component A is 6 bytes long and contains the Destination Address. Component B is 6 bytes long and contains the Source Address. Component E is 2 bytes long and contains the VLAN Type 0x8100. It is optional. Component F is 2 bytes long and contains the VLAN Tag. It is optional. Component G is 2 bytes long and contains the Ethernet Type 0x0800. The second group of components is called the Outer IPv4 Header and are Components H-L. In total, they are 20 bytes long. Component H is 9 bytes long and contains Misc Data. Component I is one byte long and contains Protocol 0x11. Component J is 2 bytes long and contains the Header Checksum. Component K is 4 bytes long and contains the Source IP. Component L is 4 bytes long and contains the Destination IP. The third group of components is known as the Outer UPD Header and are Components M-P. In total, they are 8 bytes long. Component M is 2 bytes and contains the Source Port. Component N is 2 bytes long and contains the VxLAN Port. Component O is 2 bytes long and contains the UDP length. Component P is 2 bytes long and contains a Checksum 0x0000. The last and fourth group of components are Components Q-T. In total they are 8 bytes long. Component Q is one byte long which contains the VxLAN Flags. Component R is 3 bytes long and is Reserved. Component S is 3 bytes long and contains VNI. Component T is one byte long and is Reserved. This leave the Inner L2 Header & Payload (not numbered—a total of 14 bytes or 18 byte if the options are included) is the Destination Address (6 bytes), the Source Address (6 bytes), VLAN type 0x8100 (2 bytes—optional), VLAN Tag (2 bytes—optional), and Ethernet Type 0x0800 (2 bytes).

All VLAN, QinQ, and VxLAN tags are removed by the management system before being placed inside a client's virtual data center.

Figure 5:
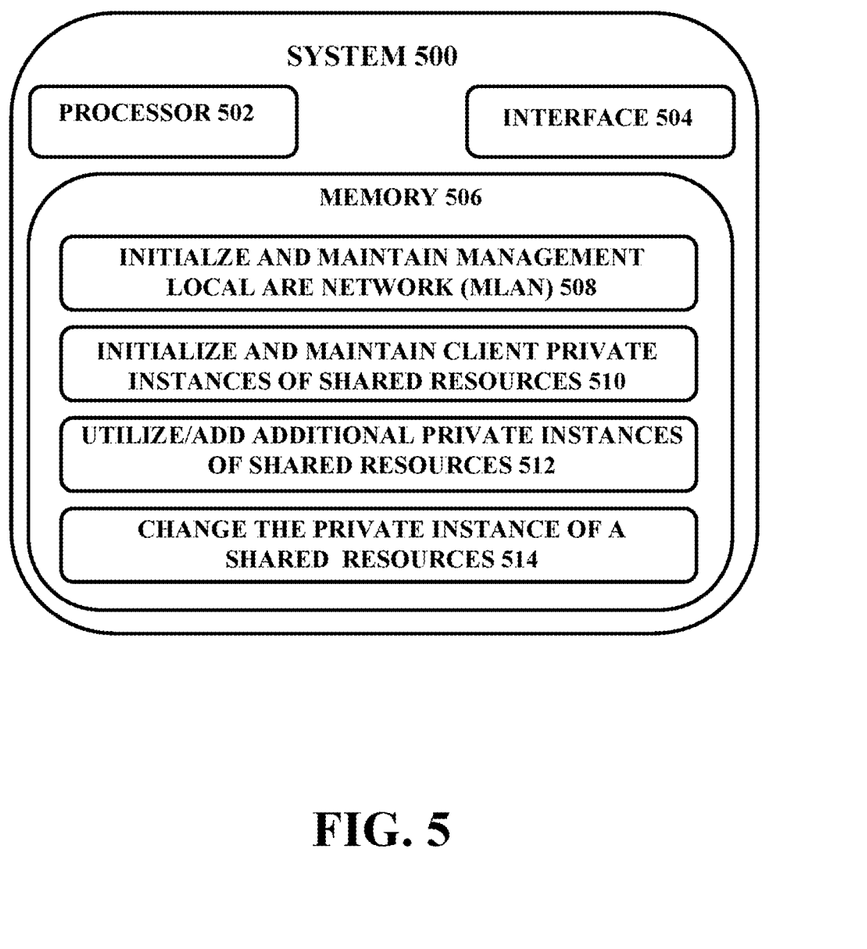
FIG. 5 demonstrates a system for organizing and managing private instances of share resources.

FIG. 5 illustrates a system 500 for organizing and managing private instances of shared resources, in accordance with an embodiment of the present invention. Although the present subject matter is explained considering that the present invention is implemented in the system 500, it may be understood that the present invention may also be implemented in a variety of computing systems, such as a laptop computer, a desktop computer, a notebook, a workstation, a mainframe computer, a server, a network server, and the like. It will be understood that the system 500 may be accessed by multiple users, or applications residing on the database system. Examples of the system 500 may include, but are not limited to, a portable computer, a personal digital assistant, a handheld node, sensors, routers, gateways and a workstation. The system 500 is communicatively coupled to each other and/or other nodes or a nodes or apparatuses to form a network (not shown). Examples of the system 500 may include, but are not limited to, a portable computer, a personal digital assistant, a handheld node, sensors, routers, gateways and a workstation.

The system 500 may include a processor 502, an interface 504, and a memory 506. The processor 502 may be implemented as one or more microprocessors, microcomputers, microcontrollers, digital signal processors, central processing units, state machines, logic circuitries, and/or any nodes that manipulate signals based on operational instructions. Among other capabilities, the at least one processor is configured to fetch and execute computer-readable instructions or modules stored in the memory 506.

The interface (I/O interface) 504, may include a variety of software and hardware interfaces, for example, a web interface, a graphical user interface, and the like. The I/O interface may allow the database system, the first node, the second node, and the third node to interact with a user directly. Further, the I/O interface may enable the node 504 to communicate with other nodes or nodes, computing nodes, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of nodes to one another or to another server. The I/O interface may provide interaction between the user and the system 500 via, a screen or management console provided for the interface.

The memory 506 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 506 may include plurality of instructions or modules or applications to perform various functionalities. The memory includes routines, programs, objects, components, data structures, etc., which perform particular tasks or implement particular abstract data types.

In one implementation, a system 500 for organizing and managing private instances of shared resources is disclosed. The system comprises at least one network switch, and at least one computing device. The computing device includes at least one management console 504 to interface with at least one client, at least one network connection, and at least one storage device. The storage device containing software is capable of initializing and maintaining a management local area network (MLAN) comprising a firewall/vtep/router 508, and a plurality of client virtual local area networks (networks) 510, wherein each client network comprises a virtual firewall/vtep/router and a plurality of private instances of shared resources. 512 is the utilization/addition of private instances of shared resources. 514 is change of a private instance of a shared resource.

The storage device (memory) 506 may further include at least an encrypting folder configured to store at least encryption keys. The encryption keys are accessible by clients connected via the network switch to the system.

The storage device (memory) 506 may further communicate the determination of the private instances of share resources on the networkable computing devices to at least a client connected via a network switch. The storage device (memory) 506 may receive the client information regarding the private instances of shared resources.

The storage device (memory) 506 may receive at least one request into the system via management console, the request is preferably received remotely and preferably associated with rules that limit the request.

Figure 6:
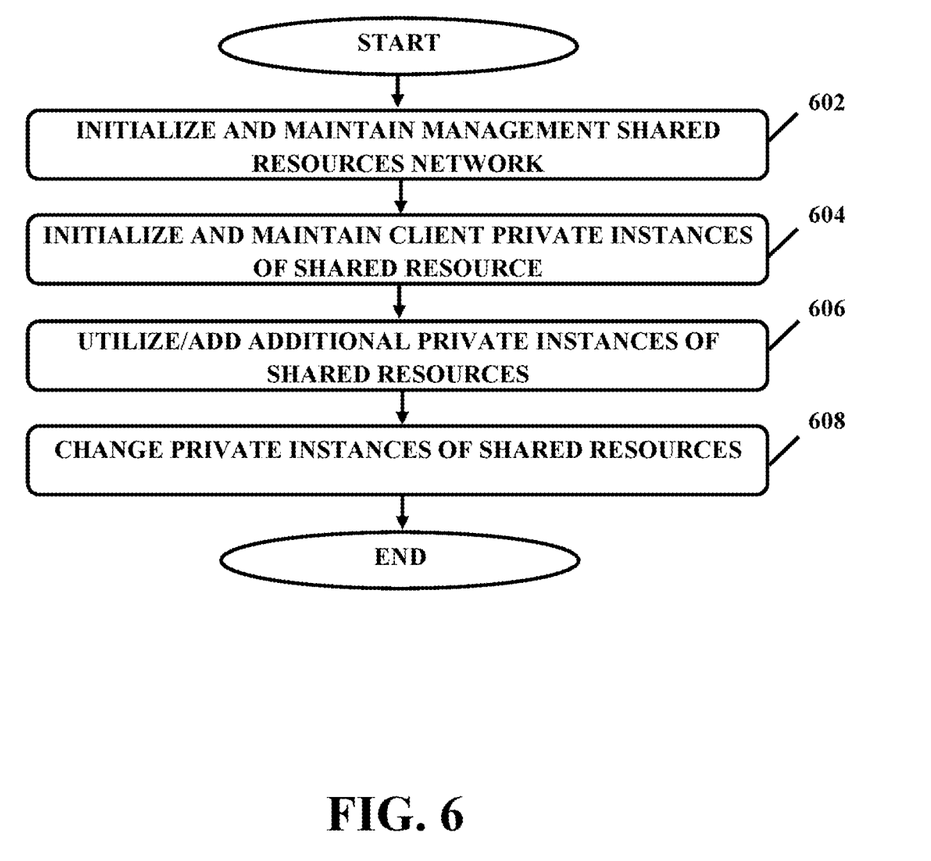
FIG. 6 demonstrates a method for organizing and managing private instances of shared resources.

FIG. 6 illustrates a method for organizing and managing network resources, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described in FIG. 6.

In one implementation, method for organizing and managing private instances of shared resources is disclosed.

At block 602, a management local area network (MLAN) comprising a firewall/vtep/router is initialized.

At block 604, a plurality of client virtual local area networks (VLANs) are added. Each client network comprises a virtual firewall/vtep/router and a plurality of network resources. The plurality of the network resources are virtual resources determined, and allocated via a selection mechanism using at least a resource factor, on at least one networkable computing devices.

At block 606, the MLAN and client networks are maintained.

At block 608, private instances of shared resources are available on a shared resource network.

At block 610, replicas of the shared resources are available on the client's network.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described node embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for system and method for providing private instances of shared resources have been described in language specific to structural features and/or methods, it is to be understood that the appended claims are not necessarily limited to the specific features or methods described. Rather, the specific features and methods are disclosed as examples of implementations of the system and method for providing instances of shared resources.

I claim:

1. A system for sharing resources, the system comprising a firewall, a virtual terminal end point (VTEP), either singly or in any combination, virtual local area networks (VLANs), virtual extensible local area networks (VxLANs), a management local area network (MLAN), and a client's virtual data center consisting of:
   at least one network switch,
   at least one storage device containing software configured to:
   initialize and maintain a management local area network (MLAN) comprising a firewall, VTEP, or any combination, wherein the firewall, VTEP, or any combination contains an Ethernet port;
   initialize and maintain a plurality of virtual local area networks (VLANs) that utilizes VxLAN standard for providing private instances of shared resources;

wherein each VLAN has a corresponding firewall, VTEP, or any combination;
that initialize and maintain a plurality of VLANs, creating an Ethernet device without IP address and routing information,
creating an empty VLAN that is not allocated for external traffic between the MLAN firewall, VTEP, or any combination, and a client firewall, VTEP, or an combination associated with a shared network resource;
add a port to the firewall, VTEP, or any combination in accordance with a network address table associated with the firewall, VTEP, or any combination; and
remove all VxLAN tags, QinQ tags, or VLAN tags, by a management system before placing the packet inside a corresponding client's virtual data center.

2. A system according to claim 1, further comprising: a group of storage servers configured to start redundant copies of the firewall, VTEP, or any combination; wherein each instance of the firewall, VTEP, or any combination containing the same MAC address and network assignment for an attached Ethernet ports.

3. A system according to claim 1, wherein the plurality of VLANs share network resources.

4. A system according to claim 1, wherein the plurality of client VLANs share the plurality of network resources.

5. A system according to claim 1, wherein the firewall, VTEP, or any combination of any network is a virtual resource.

6. A system according to claim 1, wherein the firewall, VTEP, or any combination, of any network is a physical resource.

7. A system according to claim 1, the system further comprising: software configured to, create private instances of shared resources on the client's network.

8. A system according to claim 1, the system further comprising: software configured to having their MAC/IP assigned and made visible.

9. An apparatus comprising a firewall, a virtual terminal end point (VTEP), either singly or in any combination, virtual local area networks (VLANs), virtual extensible local area networks (VxLANs), a management local area network (MLAN), and a client's virtual data center consisting of:
at least one network switch,
at least one network containing a firewall, VTEP, or any combination, each firewall, VTEP, or any combination having at least one Ethernet port,
at least one storage device containing software configured to: implement a management system and a management local area network (MLAN) containing a firewall, VTEP, or any combination;
wherein the firewall, VTEP, or any combination, contains a network port,
at least one management console to interface with said at least one client and at least one storage device containing software configured to:
add an encrypted file to the encrypted folder containing the client's access keys,
initialize and maintain a plurality of virtual local area networks (VLANs) as virtual extensible local area networks (VxLANs) for providing private instances of shared resources each of the VLANs comprising a firewall, VTEP, or any combination, with a network port, and each of the client VLANs including a network port addressable from only the MLAN;
adding a plurality of network resources to the client VLANs wherein the plurality of network resources are resources allocated on a networkable computing device;
and, initializing and maintaining a plurality of client VLANs comprising creating an Ethernet device without IP address and routing information,
creating an empty VLAN that is not allocated for external traffic between the VLAN firewall, VTEP or any combination and a client firewall, VTEP or any combination associated with a shared network resource;
add a virtual port to the client firewall in accordance with a network address table associated with the firewall, VTEP, or any combination; and
placing an encrypted file accessible by the client within an encrypted folder.

10. An apparatus according to claim 9, wherein the shared resources are virtual resources.

11. An apparatus according to claim 9, wherein the shared resources are physical resources.

12. An apparatus of claim 9 further comprising software configured to create private instances of shared resources on the client's network.

13. A method, the method comprising a firewall, a virtual terminal end point (VTEP), either singly or in combination, virtual local area networks (VLANs), virtual extensible local area networks (VxLANs), a management local area network (MLAN), and a client's virtual data center, consisting of the steps of:
initializing and maintaining, by at least one of a plurality of computing devices, a management local area network (MLAN) comprising at least a firewall, vtep, or any combination:
wherein the firewall, VTEP, or any combination contains an Ethernet port;
initializing and maintaining virtual local area networks (VLANs) that utilizes the virtual extensible local area networks (VxLANs) standard for providing private instances of shared resources;
each of the VLANs comprising a firewall, VTEP or any combination with an Ethernet port, and each of the VLANs are addressable from only the MLAN,
wherein the plurality of the network resources are virtual resources allocated on at least one networkable computing device, and
the step of initializing and maintaining a plurality of client VLANs comprises creating an Ethernet device without IP address and routing information, and,
creating an empty VLAN that is not allocated for external traffic between the client firewall, VTEP, or any combination and the MLAN firewall, VTEP, or any combination,
adding a port to the client firewall, vtep, or any combination, in accordance with a network address table associate with the client firewall, VTEP, or any combination, using the management system and,
remove from the data packet all VxLAN tags, all QinQ tags, or all VLAN tags by a management system before placing inside a corresponding client's virtual data center to provide a filtered packet.

14. A method according to claim 13, wherein the plurality of network resources are virtual resources.

15. A method according to claim 13 wherein at least one of the plurality of network resources is physical resources.

16. A method accord in to claim 13, wherein the firewall, VTEP, or any combination with the network port is one of a virtual firewall, a virtual VTEP, or any combination.

17. A method according to claim 13, wherein the respective device with the communications port is one of a physical firewall, a physical router, and a physical VTEP.

18. A method according to claim 13, wherein the plurality of client VLANs share the plurality of network resources.

19. A method according to claim 13, wherein at least one of the plurality of network, resources is physical hardware.

20. A method according to claim 13, further comprising the step of: creating, by a client connected with said at least one of a plurality of computing devices, private instances of the plurality of network resources on the client's network.

* * * * *